(12) United States Patent
Schlarb et al.

(10) Patent No.: US 9,038,021 B2
(45) Date of Patent: May 19, 2015

(54) NAMING ALGORITHM FOR EXTENSION FIELDS IN DE-NORMALIZED VIEWS

(75) Inventors: Uwe Schlarb, Oestringen (DE); Rene Dehn, Sinsheim (DE); Daniel Figus, Wallduern (DE); Daniel Niehoff, Sandhausen (DE); Stefan Baeuerle, Rauenberg-Rotenberg (DE); Georg Wilhelm, Nussloch (DE)

(73) Assignee: SAP AG, Walldorf (DE)

( * ) Notice: Subject to any disclaimer, the term of this patent is extended or adjusted under 35 U.S.C. 154(b) by 339 days.

(21) Appl. No.: 13/586,189

(22) Filed: Aug. 15, 2012

(65) Prior Publication Data

US 2014/0053133 A1    Feb. 20, 2014

(51) Int. Cl.
*G06F 9/44* (2006.01)
(52) U.S. Cl.
CPC ........................................ *G06F 8/24* (2013.01)
(58) Field of Classification Search
USPC ......................................................... 717/120
See application file for complete search history.

(56) References Cited

U.S. PATENT DOCUMENTS

| | | | | |
|---|---|---|---|---|
| 8,224,828 B2* | 7/2012 | Figus | ........................... | 707/756 |
| 8,478,616 B2* | 7/2013 | De Klerk et al. | ............ | 705/7.11 |
| 8,805,864 B2* | 8/2014 | Figus | ........................... | 707/756 |
| 8,869,105 B2* | 10/2014 | Weller et al. | ................... | 717/113 |
| 2007/0299704 A1* | 12/2007 | Wildhagen et al. | ............... | 705/7 |
| 2009/0164414 A1* | 6/2009 | Tatzel et al. | ........................ | 707/2 |
| 2010/0057776 A1* | 3/2010 | Baeuerle et al. | ........... | 707/104.1 |
| 2010/0161648 A1* | 6/2010 | Eberlein et al. | ............... | 707/769 |
| 2011/0153576 A1* | 6/2011 | Figus | ........................... | 707/692 |
| 2012/0030225 A1* | 2/2012 | Muller et al. | ................... | 707/760 |
| 2012/0239707 A1* | 9/2012 | Figus | ........................... | 707/803 |
| 2013/0132929 A1* | 5/2013 | Weller et al. | ................... | 717/113 |
| 2014/0053133 A1* | 2/2014 | Schlarb et al. | ................ | 717/120 |
| 2014/0082415 A1* | 3/2014 | Schlarb et al. | ................... | 714/15 |

* cited by examiner

*Primary Examiner* — Marina Lee
(74) *Attorney, Agent, or Firm* — Mintz Levin Cohn Ferris Glovsky and Popeo, P.C.

(57) ABSTRACT

An extension naming approach for avoiding naming collisions in de-normalized view on a business object can include accessing a reference field bundle, which includes reference field(s) corresponding to a core business object defined in a core software platform of a software architecture, from a metadata repository. A user can define an extension to the business object based on the core business object, for example via a development environment. The reference field(s) can include a defined path from a node in a peripheral object to a corresponding node in the core business object. A unique and reproducible name for the extension field can be generated based on the reference field, and the extension field with the unique and reproducible name can be added to the business object and to a data model of the peripheral object.

19 Claims, 10 Drawing Sheets

600

Reference Field: SALES_ORDER_OIF-SALES_ORDER_ROOT
Controller-Field: SALES_ORDER_OIF_ECO-ROOT-SALES_ORDER_ID
Persistent BO Node: SALES_ORDER-ROOT Reference Field: SALES_ORDER_OIF-SALES_ORDER_ITEM
Controller-Field: SALES_ORDER_OIF_ECO-ITEM-ITEM_ID
Persistent BO Node: SALES_ORDER-ITEM

FIG. 6

NAMING ALGORITHM FOR EXTENSION FIELDS IN DE-NORMALIZED VIEWS

TECHNICAL FIELD

The subject matter described herein relates to naming algorithms for extension fields in denormalized views of data object (e.g. business object) extensions.

BACKGROUND

A development environment can be offered by the developer of a core platform of a business software architecture, such as for example an enterprise resource planning (ERP) program or system, to business partners to allow those business partners to develop add-ons based on the business software architecture. However, problems can arise when extensions added via such mechanisms are presented in a de-normalized view, in which data are present in a same table or other flat structure. Collisions between redundantly named nodes or other data structures can lead to issues that are not well addressed by currently available approaches.

SUMMARY

A naming approach for extensions added in a development environment consistent with implementations of the current subject matter can aid in avoiding naming collisions between extension field names in a de-normalized view on a business object. Extension field names in a de-normalized view can be reproducible across systems such that an upgrade of a software add-on or version does not break customer extensions reliant upon the business object. In aspect of the current subject matter, a method includes receiving, via a development environment supporting extensions to a business object model of a software architecture, a definition of an extension field to a business object. The method further includes accessing a reference field bundle from a metadata repository. The reference field bundle includes at least one reference field corresponding to a core business object defined in a core software platform of the software architecture. The business object is based on the core business object, and the at least one reference field includes a defined path from a node in a peripheral object to a corresponding node in the core business object. A unique and reproducible name for the extension field is generated based on the reference field, and the extension field with the unique and reproducible name is added to the business object and to a data model of the peripheral object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 shows a table illustrating mappings in a field reference bundle consistent with implementations of the current subject matter;

When practical, similar reference numbers denote similar structures, features, or elements.

DETAILED DESCRIPTION

Figure 1:
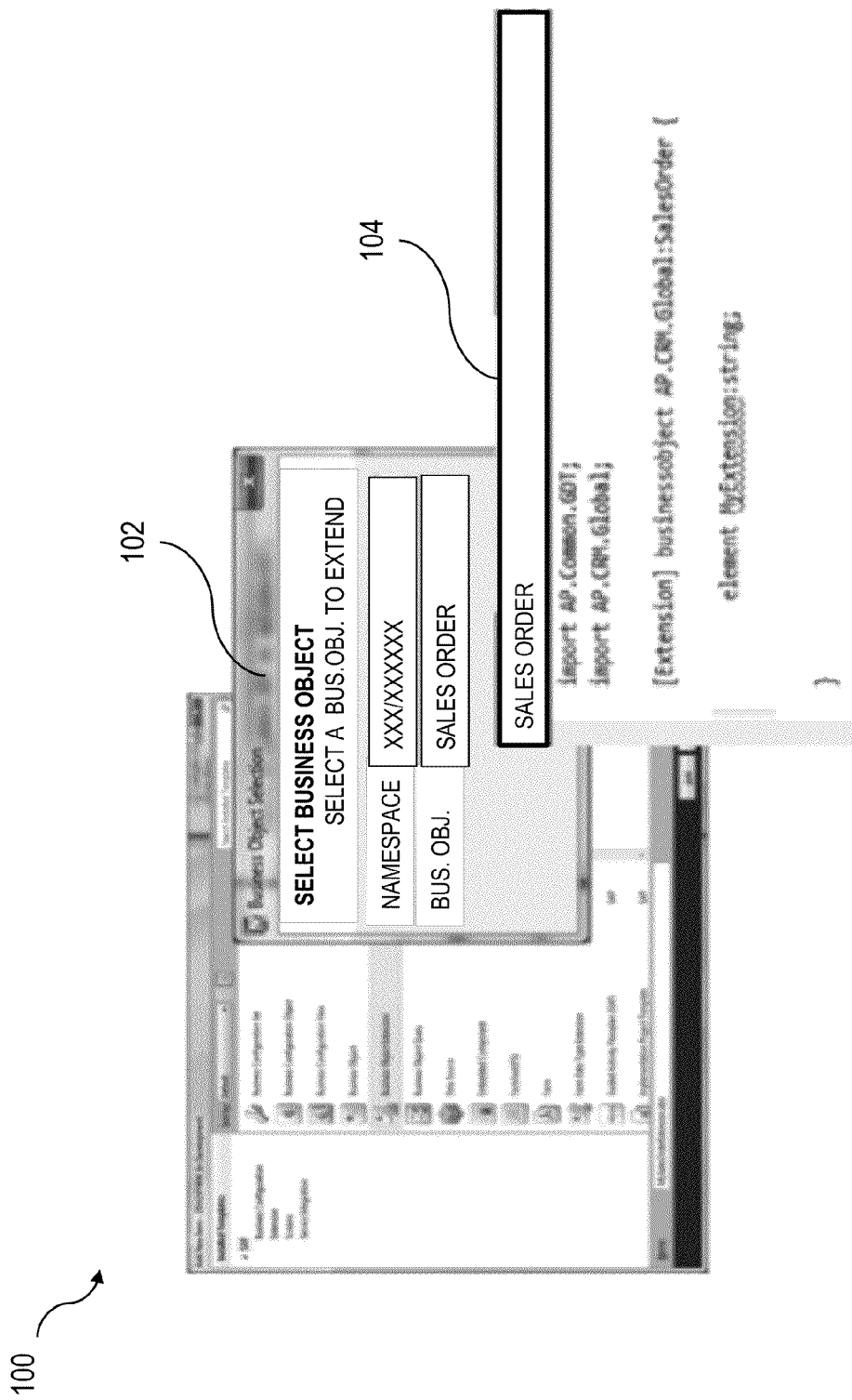
FIG. 1 shows a view of a user interface screen illustrating an example of an approach for adding a business object extension.

In some examples of development environments for business software architectures, a business partner creating an add-on can do so through addition of one or more extension fields to one or more data objects, which can include but are not limited to business objects (e.g. a sales order business subject or the like), in the business software architecture. FIG. 1 shows a screen view 100 illustrating an example of an approach for adding a business object extension. In the non-limiting example of FIG. 1, a business object selection window 102 can allow a user to select business object and a namespace and to then open an extension definition window 104 to define the extension to the selected business object.

Figure 2:
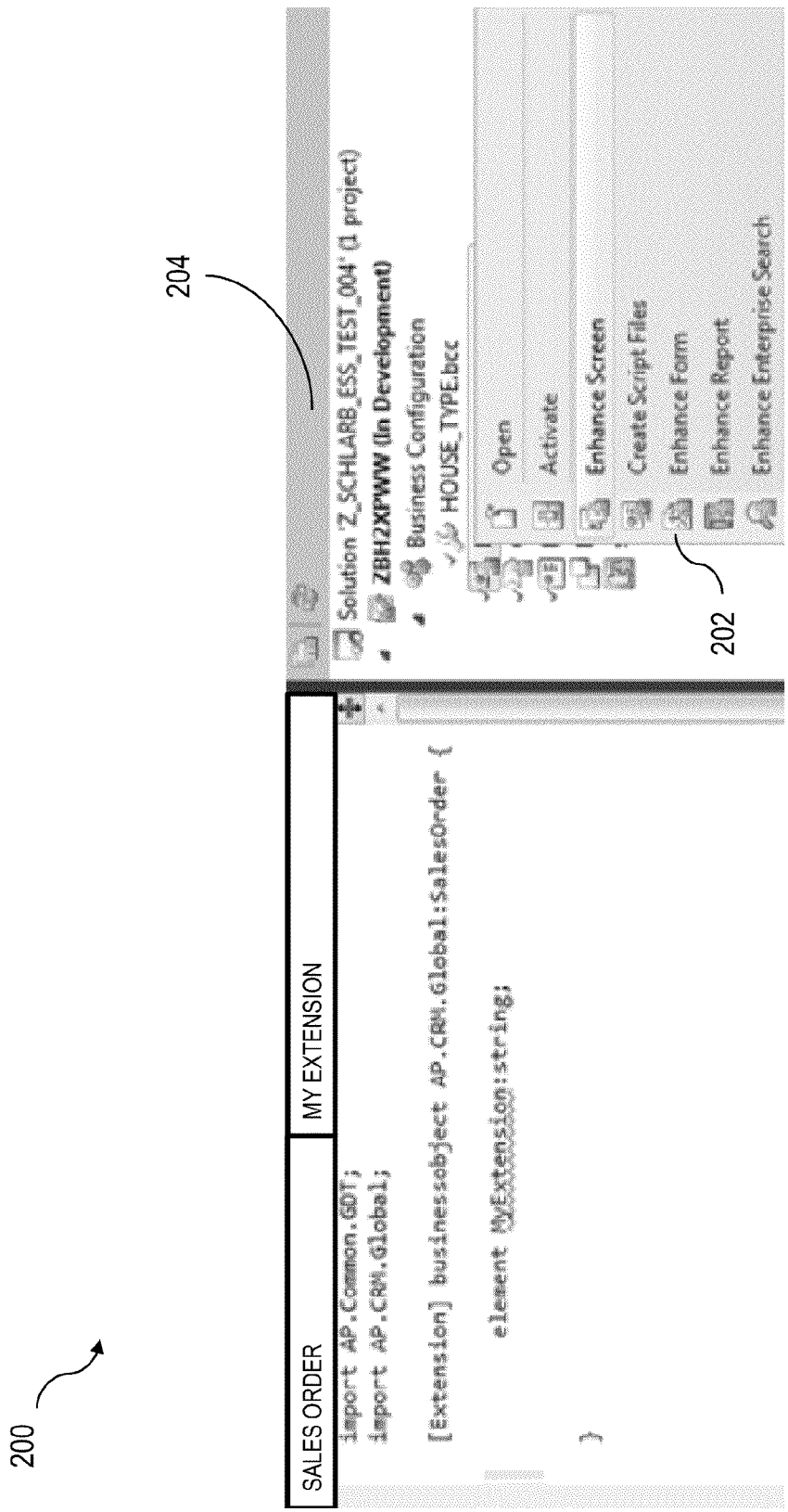
FIG. 2 shows a view of a user interface screen illustrating an example of a context menu in a navigation tree.

Extension fields can optionally be made available in a periphery feature of the business object, for example in a user interface (UI), on forms, in a search engine, or the like. As shown in the screen view 200 of FIG. 2, a context menu 202 in a navigation tree 204 can be available to enable a user to select a menu item. Examples of selectable menu items can include, but are not limited to enhance screen, enhance form, enhance enterprise search, and the like.

In general, making an extension field available in a periphery feature can be achieved through extension of one or more underlying data models, such as for example a controller business object, a form message type, a query input parameter structure, or the like, which represent de-normalized views on the business object or business objects being extended. To achieve a simplified view on the development environment, these underlying one or more data models are typically not exposed to the partner making the extensions. Accordingly, the data models are extended in a less than fully transparent manner. To ensure that naming collisions do not occur between extension fields created in this manner, in particular over successive versions or updates or in environments in which more than one partner creates extensions that appear in a same de-normalized view, implementations of the current subject matter can provide naming algorithms fulfilling certain boundary constraints. For example, an extension field name in a de-normalized view is generally reproducible across systems so that an upgrade of the add-on does not cause customer extensions (e.g. forms) to break or otherwise become inoperable. An extension field name in the de-normalized view generally has a length constraint, such as for example a maximum length of 120 characters.

Figure 3:
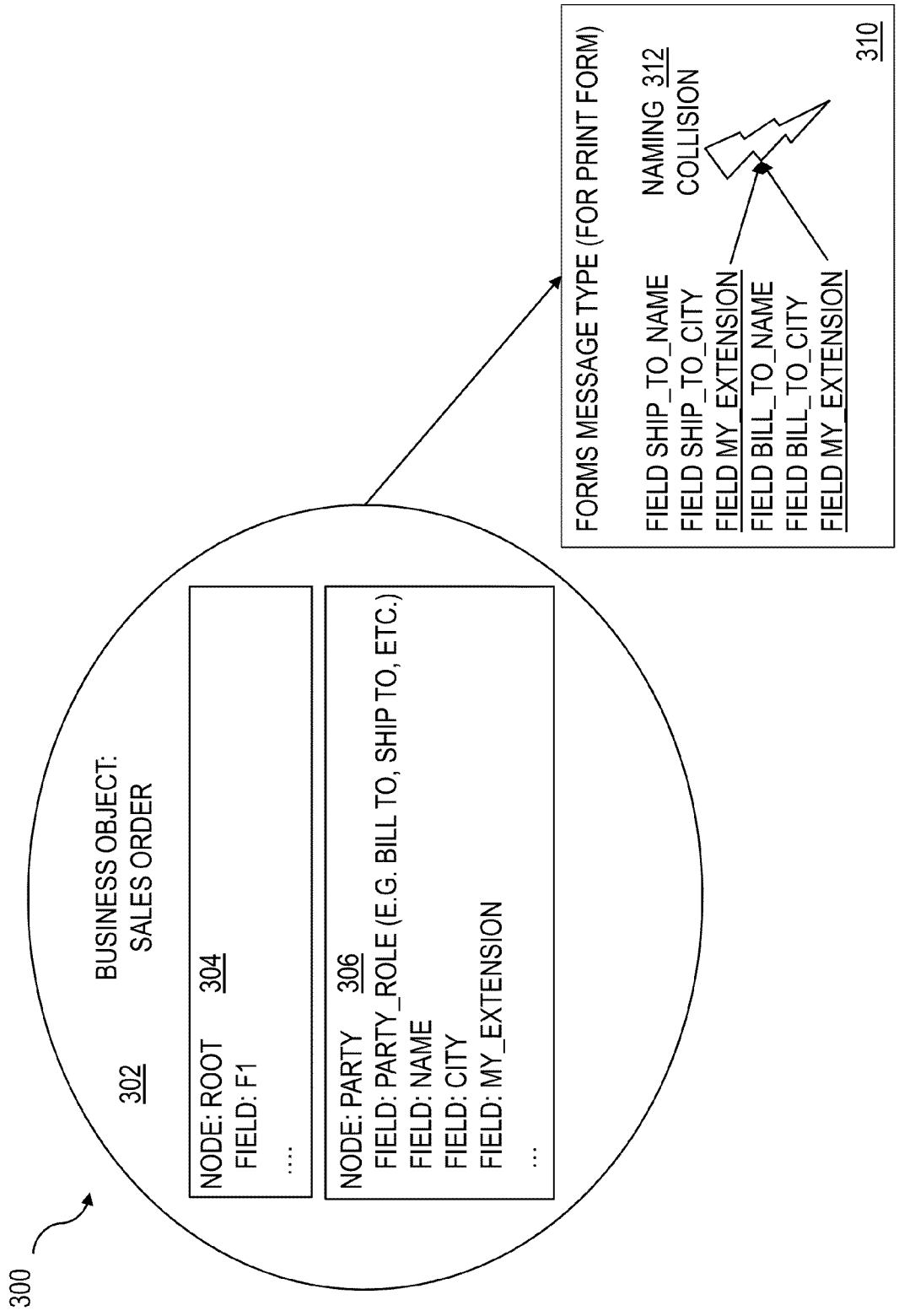
FIG. 3 shows a diagram illustrating extensions added to a business object a naming collision in a de-normalized view.

FIG. 3 shows a diagram 300 illustrating potential problems that can arise when different instances from a specific business object node are displayed in a single flat structure. As shown in FIG. 3, a sales order business object 302 can include a "Root" node 304 and a "Party" node 306. The "Party" node 306 can contain information (e.g. in fields) about one or more business partners, such as for example a Ship_To partner, a Bill_To partner, and the like. On the level of a controller business object or in a print form 310 (as shown in the example of FIG. 3), data from the fields of the business object (e.g. the Ship_To and Bill_To fields) can be assembled into one flat structure, for example as the fields Ship_To_Name, Bill_To Name, etc. A developer or development team can generally manually define field names for the fields existing in a core (e.g. unextended) business object. However, if an external developer using a development environment were to add an extension field named (as an example) My_Extension to the "Party" node 306, a naming collision 312 can occur if this field were added "as is" to the print form 310 for both of the Bill_To and the Ship_To roles.

Figure 4:
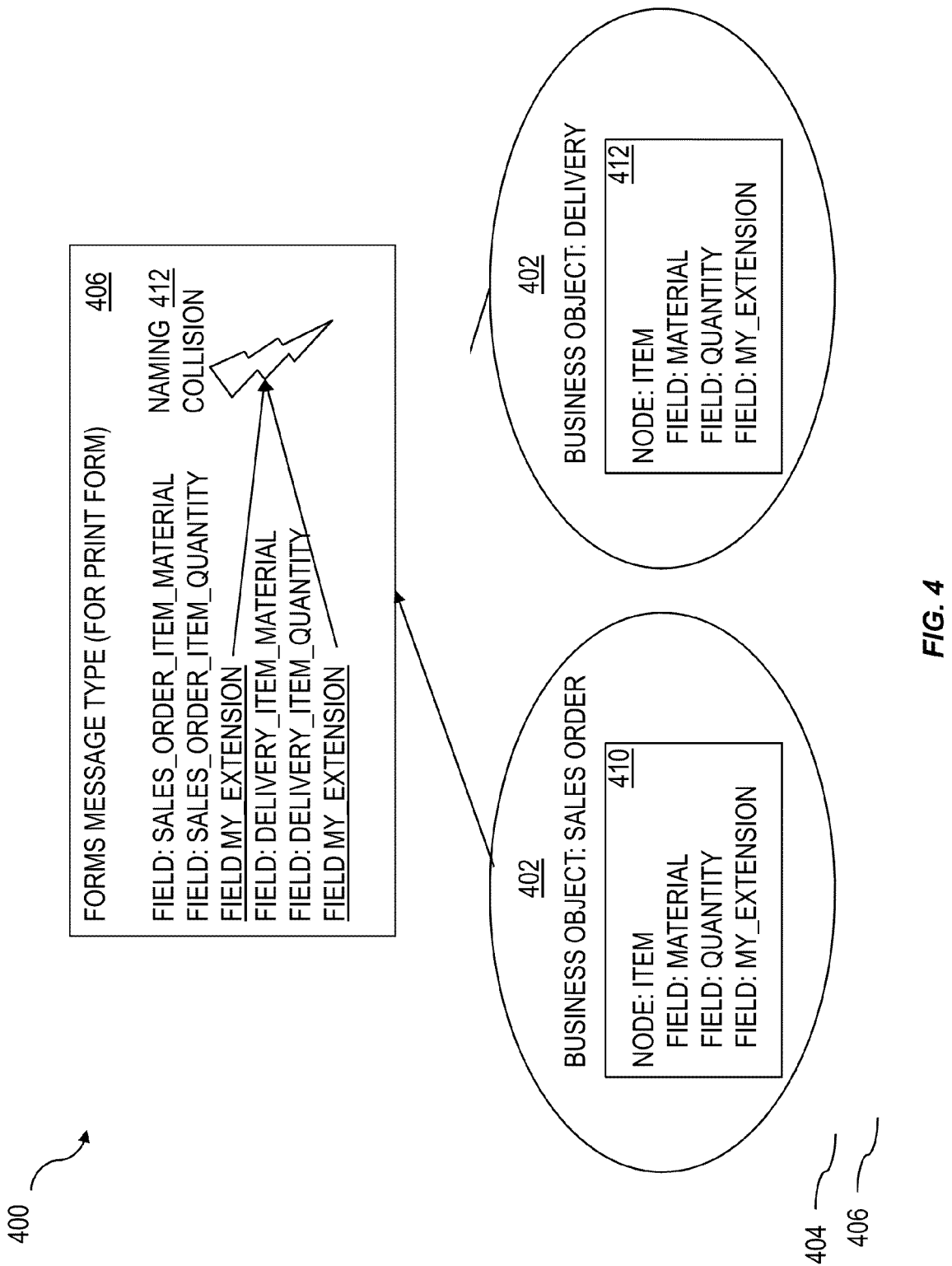
FIG. 4 shows a diagram illustrating potential naming collisions issues with conventional approaches.

Another potential issue that can leading to extension naming collisions is process-oriented field extensibility, which is explained herein in reference to FIG. 4. FIG. 4 shows a diagram 400 illustrating how data copied between business objects are sometimes displayed together in denormalized views. An example of data being copied from one business object to another can include the copying of sales information data from a sales order business object 402 to a delivery business object 404 and also to a print form 406, such as for example, an invoice. The fields within nodes on the affected business objects 402, 404 can typically have similar names (e.g. "Material", "Quantity", etc.), for example in respective "Item" nodes 410, 412.

However, in a print forms 406 or in controller business objects or other data structures using denormalized views, the resulting flat structure displays together data from the different business objects 402, 404, for example to allow comparisons. A developer or development team can generally manually define field names for the fields existing in core (e.g. unextended) business objects (e.g. fields named "Sales Order_ Item_ Material," "Delivery_Item_Material," etc. as shown in FIG. 4). However, when an extension field "My_Extension" is added, for example by an external developer via a development environment, to the sales order business object 402 and the delivery business object 404, a naming collision 412 can occur when the field name is added to the forms message type 406 without adaptation.

Figure 5:
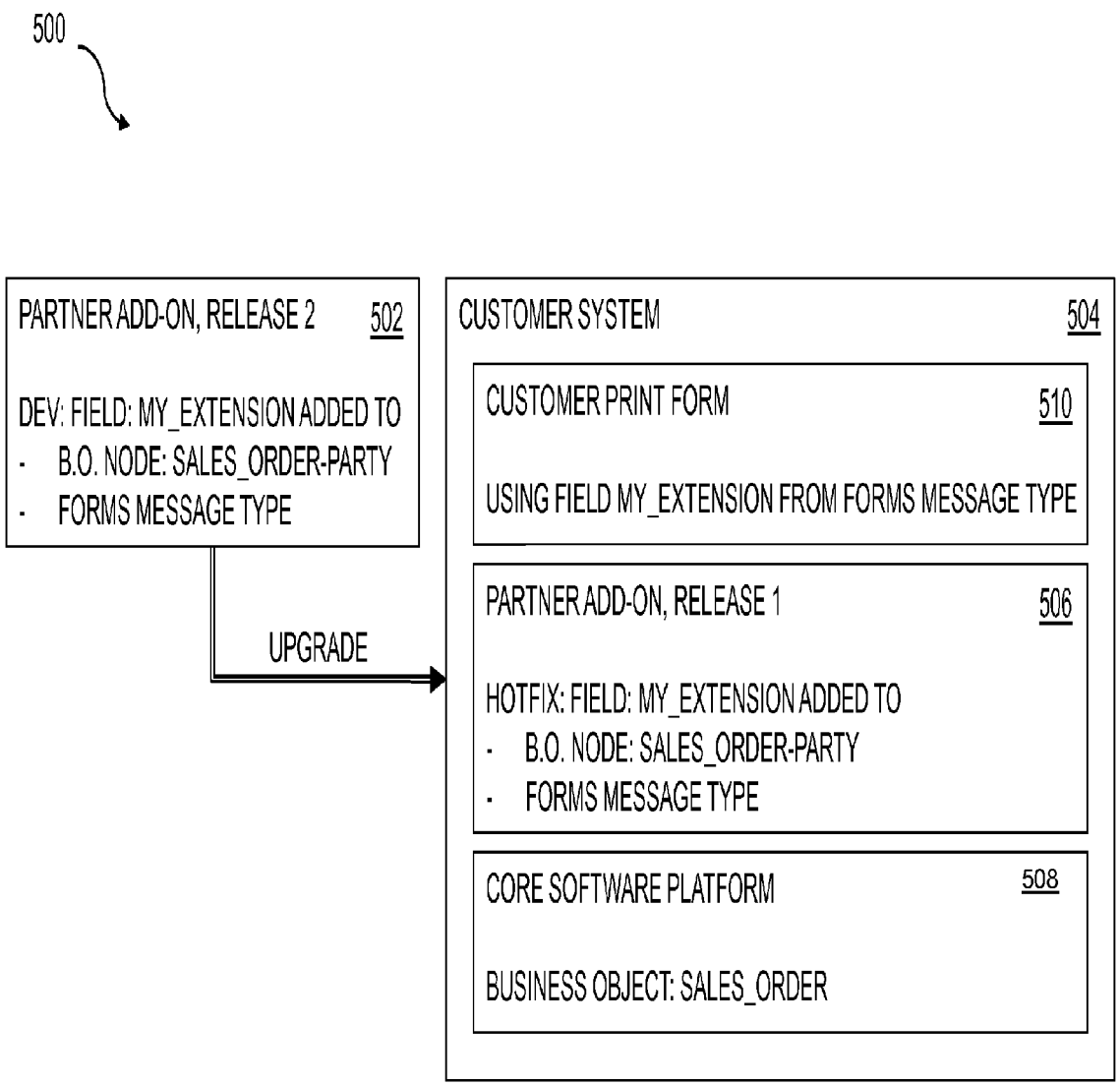
FIG. 5 shows a diagram illustrating additional potential naming collisions issues with conventional approaches.

In a partner development scenario it can also be necessary to support a situation that can be referred to as double maintenance, which is described in reference to FIG. 5. In this scenario, a partner developer adds an extension field in a development release (e.g. in a full second release 502 as shown in FIG. 5) as well as in a maintenance release (e.g. as a hot fix to be added to a customer system 504 operating in a first release 506 as shown in FIG. 5). The customer system operates a core software platform 508 of a business software architecture that includes a core business object (in this example, a sales order business object). When the customer system 504 is upgraded from the first release 506 (containing the hot fix) to the second release 502, the extension entities from the two releases should not differ such that customer-specific extensions made to the release do not break.

As an example, for a customer who has defined a print form 510 based on an extended forms message type, if an extension field in the forms message type uses different names in the first release 506 and the second release 502, the customer fond would break after the upgrade to the second release 502. Accordingly, for the names of extension fields in the periphery to be reproducible, it is generally not possible to simply use a counter at the end of the field name or a GUID.

If XML is used as a programming language, for example in a metadata repository system (MDRS), field names may be restricted to a length of 120 characters. An XML namespace can be used for the field names, for example to avoid naming collisions between the core software developer, partners, and customers. In some implementations of the current subject matter, no namespace need be used for the core fields of business objects shipped as part of the core software platform 508. Rather, only internal extensions such as globalization features or the like might use namespaces. Development partners can apply for and register namespaces. Customers can be provided with a namespace is derived via a service provider cockpit or the like.

Consistent with some implementations of the current subject matter, an extension field name in a de-normalized view can be derived based on a reference field maintained in a metadata repository (e.g. a MDRS), for example within a reference field bundle. A reference field as described herein describes a path from a place in the periphery of a business object down to a persistent business object node, for example in a core business subject proved as part of the core software platform. As an example, a reference field bundle in the metadata repository, "SALES_ORDER_OIF," can be defined to contain two reference fields, "SALES_ORDER_ROOT" and "SALES_ORDER_ITEM," which describe paths from a peripheral object (e.g. a controller business object such as SALES_ORDER_OIF_ECO) down to the core business object ("SALES_ORDER") as shown in the mapping table 600 of FIG. 6.

When adding an extension field such as My_Extension to the root node of the sales order business object in the development environment and using an "enhance screen" feature as discussed above in reference to FIG. 1, a UI designer can automatically and invisibly extend the controller business subject named SALES_ORDER_OIF. The transportable metadata in the system can include "Add Extension Field MyExtension (of type . . . ) to the root node of the sales order object to thereby make the field appear along the reference field "SALES_ORDER_OIF-SALES_ORDER_ROOT." As a result, a field extensibility generator can readily determine that behind the reference field "SALES_ORDER_OIF-SALES_ORDER_ROOT" there is a controller business object node (SALES_ORDER_OIF-ROOT) and a corresponding backend service adaptation (BSA) model which must be extended.

The extensions can be generated and are automatically regenerated when the underlying technical implementation is changed, for example when the controller business object or the BSA model is exchanged, incompatibly modified, or the like. This approach can ensure high life cycle stability. To achieve a collision free name of an extension field, the name of the business object and the name of the node to which the extension field was added can be part of the field name in the periphery. When adding an extension field (for example named My_Extension) to a business object node, additional information can be added to the name when extending the periphery of the business object to avoid naming collisions. In some implementations of the current subject matter, this feature can be performed according to the relationships such as are expressed in the following logical statements:

$$\text{Extension Field Name In View (Periphery)} = \text{Extension Field Name on Business Object} + \text{Suffix} \quad (1)$$

$$\text{Suffix} = \text{Hash}(\text{BO-Name} + \text{Node-Name} + \text{Role-Code}) \quad (2)$$

In these relationships, the "+" designates a concatenation operation, "Extension Field Name on Business Object" is the name of the extension field as defined by the developer, BO-Name is the name of the business object to which the extension field was added, Node-Name is the name of the business object node to which the extension field was added, Role-Code indicates the role of a node instance (e.g. "Ship To" and "Bill To" for the party node), and HASH is a hashed value of a string. The hashed value of a string can optionally be created using an algorithm such as the MD5 algorithm or the like. Because, as noted above, it is generally not desirable to use a counter or a GUID for the suffix since due to potential problems with reproducibility, and due to potential limitations on the length of the suffix part of the generated extension filed name, a hash value as shown in relationship 2 above can be used as the suffix.

Figure 7:
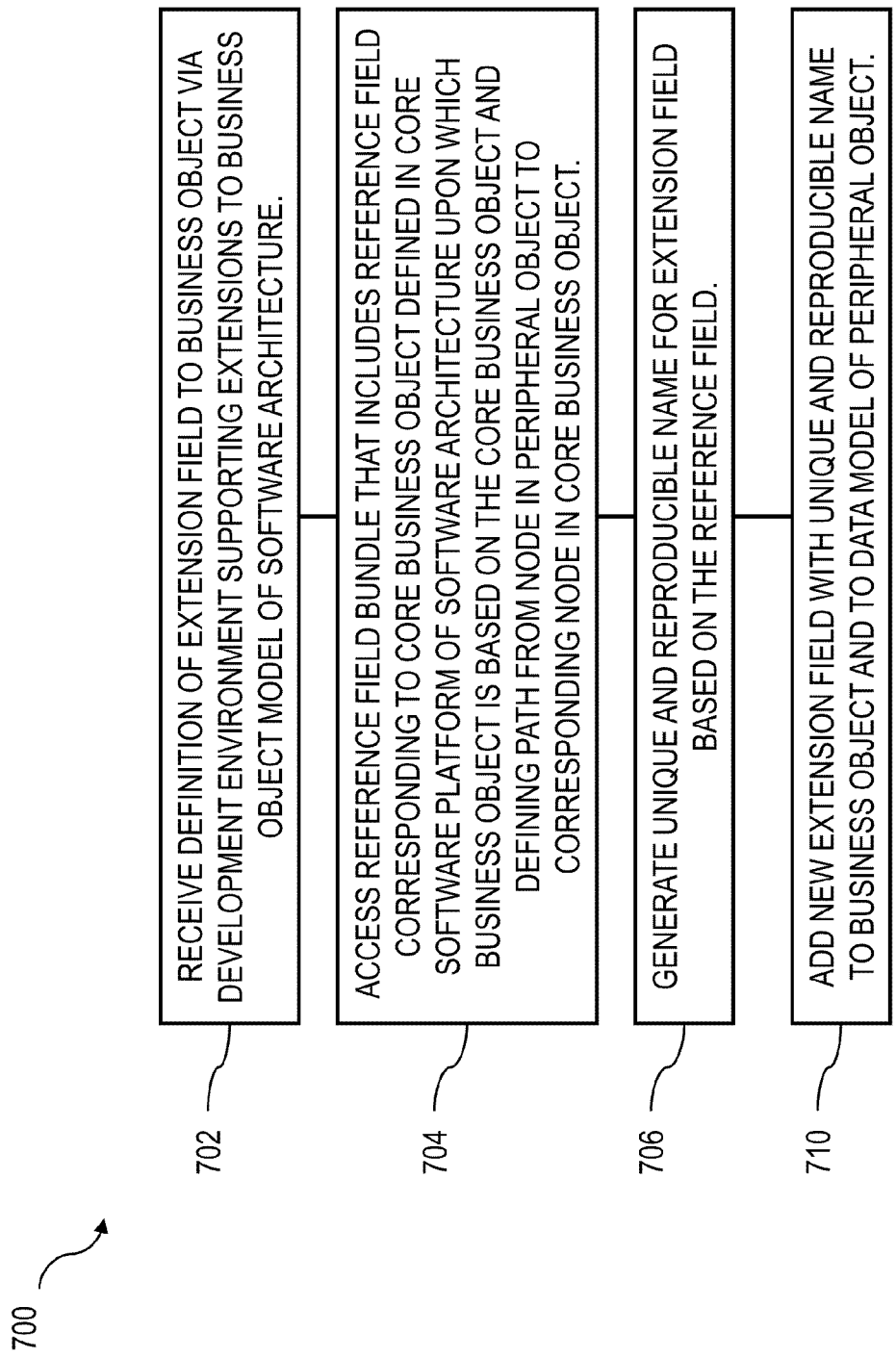
FIG. 7 is a process flow diagram illustrating aspects of a method having one or more features consistent with implementations of the current subject matter.

FIG. 7 shows a process flow chart 700 illustrating method features, one or more of which can be included in an implementation of the current subject matter. At 702, a definition of an extension field to a business object can be received, for example via a development environment supporting extensions to a business object model of a software architecture. The business object can be based on a core business object defined in a core software platform of the software architecture. At 704, a reference field bundle can be accessed from a metadata repository. The reference field bundle can include at least one reference field corresponding to the core business object. The at least one reference field can include a defined path from a node in a peripheral object to a corresponding node in the core business object. A unique and reproducible name can be generated at 706 for the extension field based on the reference field, and at 710 the extension field with the unique and reproducible name can be added to the business object and to a data model of the peripheral object. The peripheral object can represent a de-normalized view of the business object. The unique and reproducible name can be generated using a hash value based on a name of the business object to which the extension field is added, a name of the business object node to which the extension field is added, and a role of a node instance of the business object node, for example as discussed above in reference to relationships 1 and 2.

Figure 8:
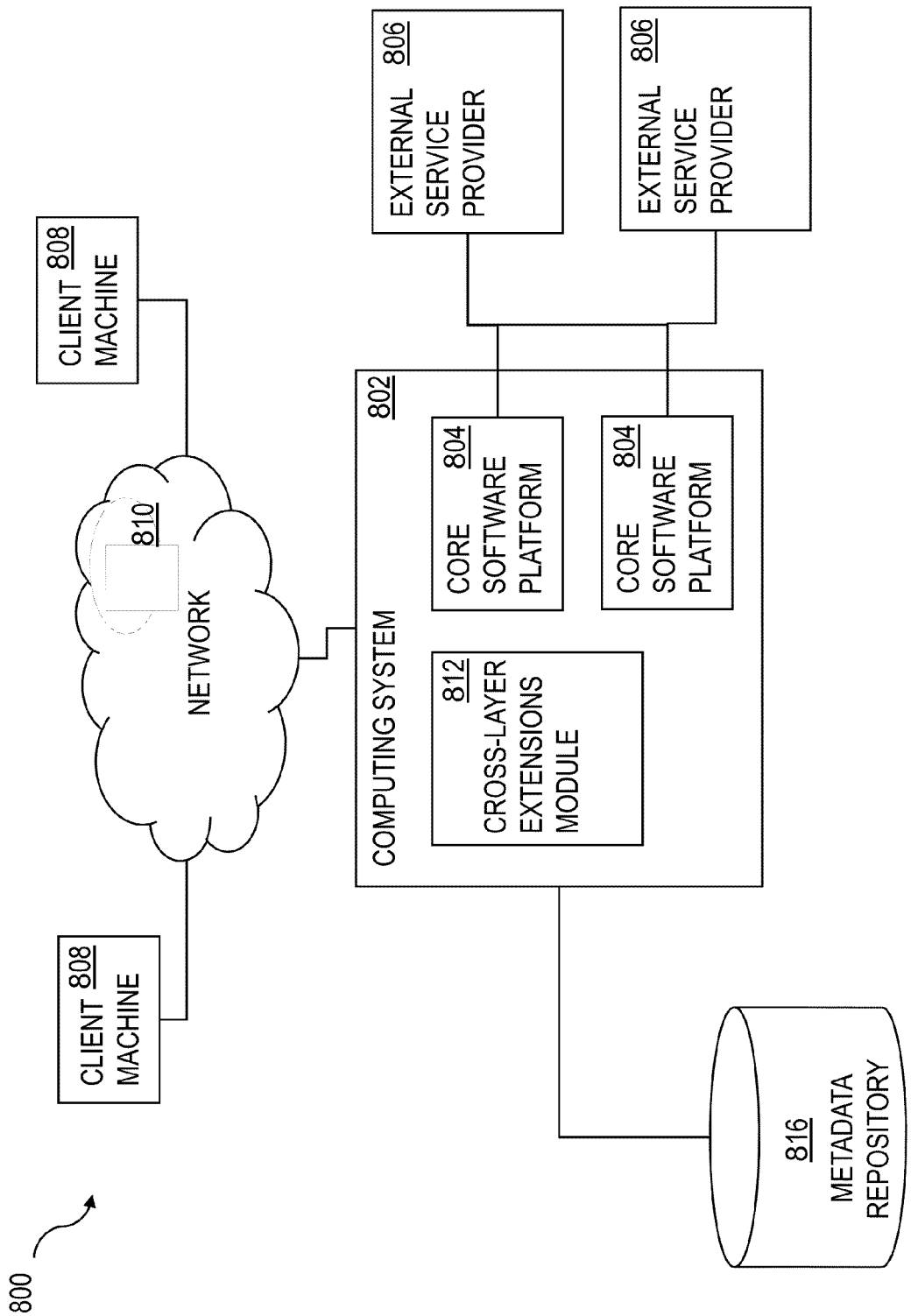
FIG. 8 is a diagram illustrating aspects of an example of a software architecture showing features consistent with implementations of the current subject matter.

The core software platform of an enterprise resource planning (ERP) system, other business software architecture, or other database functionality can in some implementations be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 8 shows a diagram of a system consistent with such an implementation. A computing system 802 can include one or more core software platform modules 804 providing one or more features of the business software system. In some implementations, the computing system 802 can be an application server. The computing system 802 can also aggregate or otherwise provide a gateway via which users can access functionality provided by one or more external service providers 806. Examples of external service providers 806 can include one or more computing systems supporting database functionality or other software functionality created or provided from a partner or other third party software developer. This external service provider database functionality or other software functionality can be provided over either direct or networked connections if the one or more external provider computing systems are separate from the computing system 802 that includes one or more core software platform modules 804. Alternatively, the external service provider database functionality or other software functionality can be hosted on the computing system 802 that includes the one or more core software platform modules 804.

Client machines 808 can access the computing system, either via a direct connection, a local terminal, or over a network 810 (e.g. a local area network, a wide area network, a wireless network, the Internet, or the like). A extension field naming module 812 or multiple such modules can execute on the computing system 802, on one or more separate systems, or any combination thereof to perform one or more of the extension field name management operations discussed in greater detail elsewhere herein. For the remainder of this disclosure, the extension field naming module 812 will be discussed in the singular. However, it will be readily understood that one or more features of the methods, techniques, approaches, etc. relating to functionality ascribed to a single extension field naming module 812 can be performed by multiple modules, which can be implemented within a single system that includes one or more processors or on multiple systems that each include one or more processors. The extension field naming module 812 can access one or more metadata repositories 816 (referred to generally herein in the singular as a metadata repository 816), which can retain one or more of metadata for use by at least one of the one or more core software platform modules 804 and the database functionality or other software functionality provided by one or more external service providers 806. The one metadata repository 816 can also retain metadata relating to the core business object model in a first (e.g. a foundation) layer of the layer business software architecture and metadata relating to the cross-layer extensions to the core business object model. The metadata repository 816 can also store objects or other elements, such as for example business objects, metadata objects, or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some implementations, a business object or other metadata object can include a template definition of a standard business process or other related functionality. The template definition can optionally be modified via one or more extensions that can also be stored in the one or more repositories 816. The one or more repositories can also include storage for data relating to the business or other aspects of the organization.

Smaller organizations can also benefit from use of business software functionality. However, such an organization may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 9:
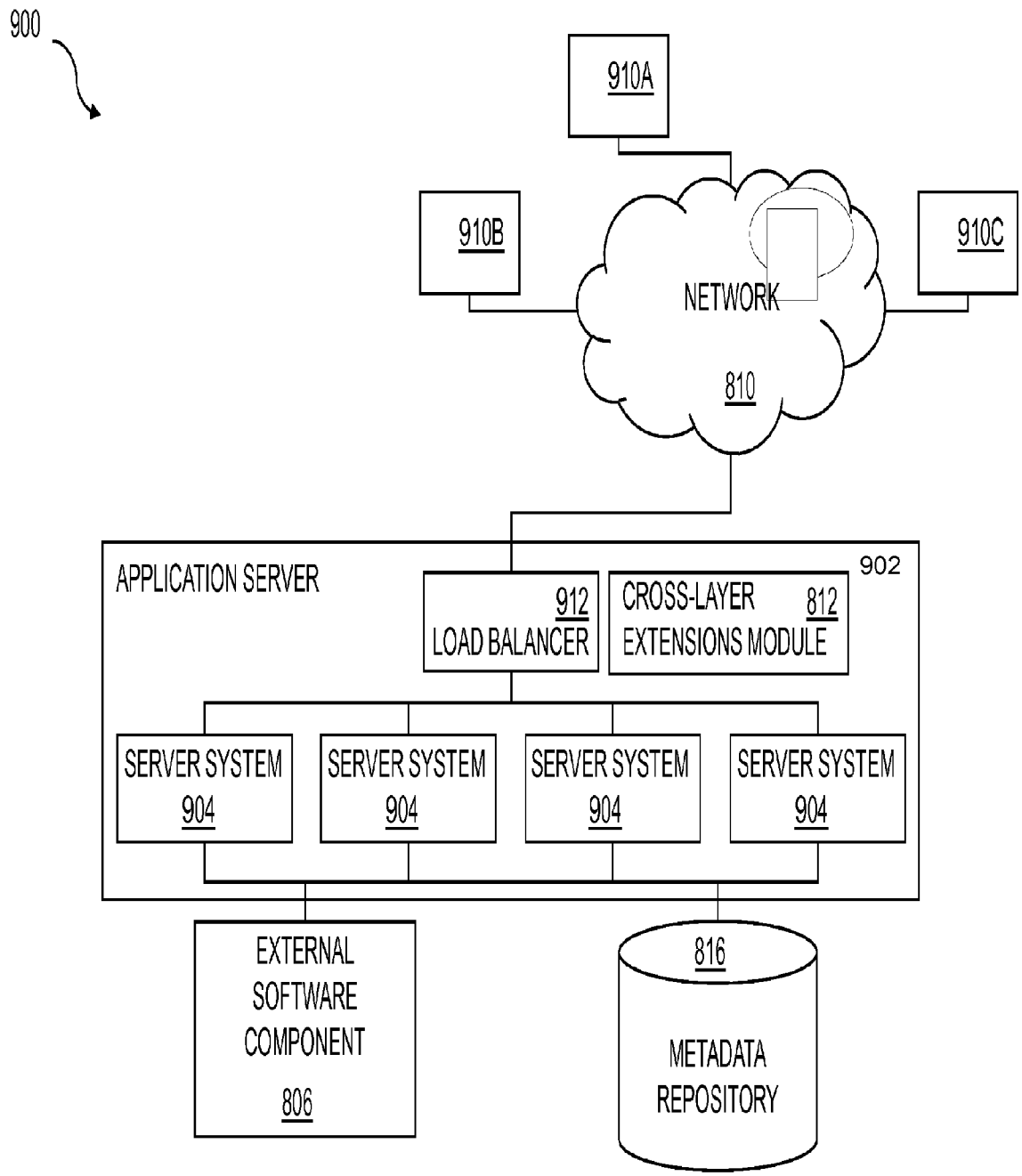
FIG. 9 is a diagram illustrating aspects of another example of a software architecture showing features consistent with implementations of the current subject matter.

FIG. 9 shows a block diagram of a multi-tenant implementation of a software delivery architecture 900 that includes an application server 902, which can in some implementations include multiple server systems 904 that are accessible over a network 906 from client machines operated by users at each of multiple organizations 910A-910C (referred to herein as "tenants" of a multi-tenant system) supported by a single software delivery architecture 900. For a system in which the application server 902 includes multiple server systems 904, the application server can include a load balancer 912 to distribute requests and actions from users at the one or more organizations 910A-910C to the one or more server systems 904. Instances of the core software platform 804 (not shown in FIG. 9) can be executed in a distributed manner across the server systems 904. A user can access the software delivery architecture across the network using a thin client, such as for example a web browser or the like, or other portal software running on a client machine. The application server 902 can access data and data objects stored in one or more metadata repositories 816 which can make one or more of metadata and other data available for use by at least one of the one or more core software platform modules 804 and the database functionality or other software functionality provided by one or more external service providers 806. The application server 902 can also serve as a middleware component via which access is provided to one or more external software components 806 that can be provided by third party developers.

As in the standalone system 800 of FIG. 8, a extension field naming module 812 or multiple such modules can execute on the computing system 802, on one or more separate systems, or any combination thereof to perform as discussed elsewhere herein. The extension field naming module 812 can access a metadata repository 816, which, as noted above, can be part of or directly accessible to the application server 902, or, alternatively or in addition, can be located remotely or optionally spread over one or more physical or virtual servers, for example as in a cloud computing arrangement. The extension field naming module or modules 812 can execute on the application server 902, on one or more separate application servers, or any combination thereof to perform one or more of the operations discussed in greater detail above. The metadata repository 816 can store metadata similar to that discussed above in reference to FIG. 8.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 902 that includes multiple server systems 904 that handle processing loads distributed by a load balancer 912. Potential benefits from such an arrangement can include, but are not limited to, high and reliably continuous application server availability and minimization of unplanned downtime, phased updating of the multiple server systems 904 to permit continuous availability (one server system 904 can be taken offline while the other systems continue to provide services via the load balancer 912), scalability via addition or removal of a server system 904 that is accessed via the load balancer 912, and de-coupled life cycle events or processes (such as for example system maintenance, software upgrades, etc.) that enable updating of the core software independently of tenant-specific customizations implemented by individual tenants.

As in the example illustrated in FIG. 8, the repository 816 can store a business object that represents a template definition of a standard business process. Each individual tenant 910A-910C can customize that standard template according to the individual business process features specific to business of the organization to which that tenant is assigned. Customizations can be stored as extensions in the metadata repository.

Figure 10:
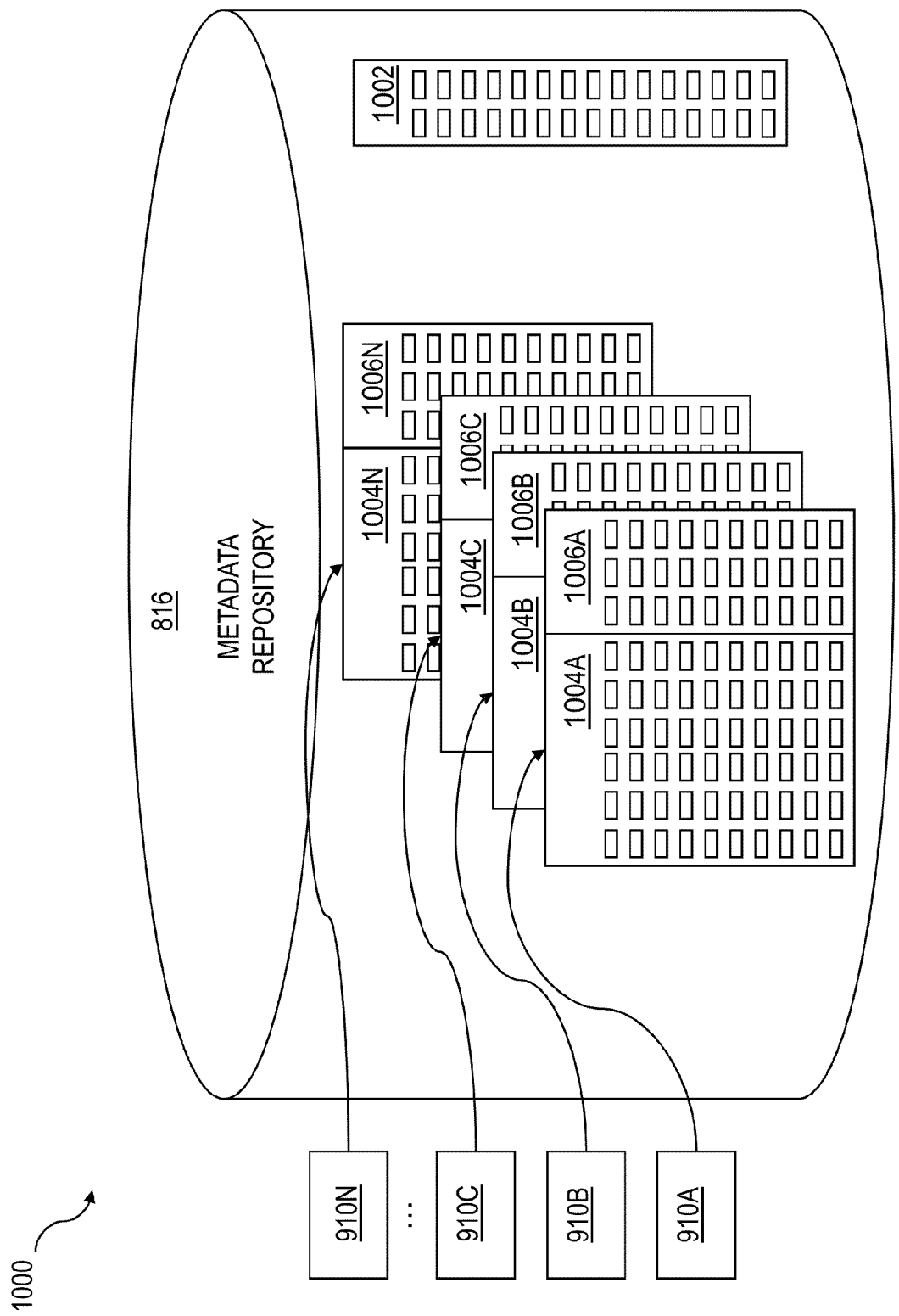
FIG. 10 is a diagram illustrating aspects of a repository showing features consistent with implementations of the current subject matter.

To provide for customization of the business process for each of multiple organizations supported by a single software delivery architecture 900, the data and data objects stored in the metadata repository 816 and/or other data repositories that are accessed by the application server 902 can include three types of content as shown in FIG. 10: core software platform content 1002 (e.g. a standard definition of a business process), system content 1004, and tenant content 1006. Core software platform content 1002 includes content that represents core functionality and is not modifiable by a tenant. System content 1004 can in some examples be created by the runtime of the core software platform and can include core data objects that store concrete data associated with specific instances of a given business process and that are modifiable with data provided by each tenant. Metadata relating to one or more of core software platform content 1002, system content 1004, and content provided by the one or more external service providers 806 can optionally be part of a system tenant that is accessible from all other tenants 910A-910N.

The data and/or the metadata retained in the tenant content 1006 can be tenant-specific: for example, each tenant 910A-910N can store information about its own inventory, sales orders, etc. as well as metadata pertaining to extensions, processes, or the like that are specific to the organization assigned to that tenant. Tenant content 1006A-1006N can therefore include data objects or extensions to other data objects that are customized for one specific tenant 910A-910N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 1006 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 1002 and system content 1004 and tenant content 1006 of a specific tenant are accessed to provide the business process definition and/or the status information relating to a specific instance of the business process according to customizations and business data of that tenant such that each tenant is provided access to a customized solution whose data are available only to users from that tenant.

One or more life cycle events or processes of an application server 802 can cause invalidation of the metadata retained in a buffer. A life cycle event in this context can refer to one or more of an import, an upgrade, a hot fix, or the like of one or more business objects or other data objects into a core software platform module 804 of a business software architecture or the database functionality or other software functionality provided by one or more external service providers 806. In the example of a multi-tenant approach such as described above in reference to FIG. 9 and FIG. 10, life cycle events affecting features of one or more core software platform modules 804 or of database functionality or other software functionality provided by one or more external service providers 806 can be performed in the system tenant. Similarly, other life cycle events that affect multiple tenants (e.g. scalable add-ons that can be active in multiple tenants) can also be performed on the system tenant. Life cycle events that affect only one tenant, for example upgrading, importing, hot fixing, etc. of an add-on or other custom feature that is used by only a single customer of the business software architecture; switching on or of a scalable add-on functionality for a single tenant; creating or modifying an extension to core software platform content 1002, system content 1004, or database functionality or other software functionality provided by one or more external service providers 806; or the like can be implemented only in the affected tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:
   receiving, via a development environment supporting extensions to a business object model of a software architecture, a definition of an extension field to a business object;
   accessing a reference field bundle from a metadata repository, the reference field bundle comprising at least one reference field corresponding to a core business object defined in a core software platform of the software architecture, the business object being based on the core business object, the at least one reference field comprising a defined path from a node in a peripheral object to a corresponding node in the core business object;
   generating a unique and reproducible name for the extension field based on the reference field; and
   adding the extension field with the unique and reproducible name to the business object and to a data model of the peripheral object.

2. A computer program product as in claim 1, wherein the generating comprises appending a suffix to an extension field name of the extension field in the business object, the extension field name being provided by a user in the development environment.

3. A computer program product as in claim 2, wherein the suffix comprises a hash value.

4. A computer program product as in claim 3, wherein operations performed by the processor further comprise calculating the hash value based on a name of the business object, a name of a business object node in the business object to which the extension field is added, and a role of a node instance of the business object node.

5. A computer program product as in claim 1, wherein the peripheral object represents a de-normalized view of the business object.

6. A computer program product as in claim 1, wherein the development environment conceals the unique and reproducible name from a user.

7. A system comprising:
   at least one programmable processor; and
   a machine-readable medium storing instructions that, when executed by the at least one programmable processor, cause the at least one programmable processor to perform operations comprising:
   receiving, via a development environment supporting extensions to a business object model of a software architecture, a definition of an extension field to a business object;
   accessing a reference field bundle from a metadata repository, the reference field bundle comprising at least one reference field corresponding to a core business object defined in a core software platform of the software architecture, the business object being based on the core business object, the at least one reference field comprising a defined path from a node in a peripheral object to a corresponding node in the core business object;
   generating a unique and reproducible name for the extension field based on the reference field; and
   adding the extension field with the unique and reproducible name to the business object and to a data model of the peripheral object.

8. A system as in claim 7, wherein the generating comprises appending a suffix to an extension field name of the extension field in the business object, the extension field name being provided by a user in the development environment.

9. A system as in claim 8, wherein the suffix comprises a hash value.

10. A system as in claim 9, wherein the operations further comprise calculating the hash value based on a name of the business object, a name of a business object node in the business object to which the extension field is added, and a role of a node instance of the business object node.

11. A system as in claim 7, wherein the peripheral object represents a de-normalized view of the business object.

12. A system as in claim 7, wherein the development environment conceals the unique and reproducible name from a user.

13. A computer-implemented method comprising:
   receiving, via a development environment supporting extensions to a business object model of a software architecture, a definition of an extension field to a business object;
   accessing a reference field bundle from a metadata repository, the reference field bundle comprising at least one reference field corresponding to a core business object defined in a core software platform of the software architecture, the business object being based on the core business object, the at least one reference field comprising a defined path from a node in a peripheral object to a corresponding node in the core business object;
   generating a unique and reproducible name for the extension field based on the reference field; and
   adding the extension field with the unique and reproducible name to the business object and to a data model of the peripheral object.

14. A computer-implemented method as in claim 13, wherein the generating comprises appending a suffix to an extension field name of the extension field in the business object, the extension field name being provided by a user in the development environment.

15. A computer-implemented method as in claim 14, wherein the suffix comprises a hash value.

16. A computer-implemented method as in claim 15, wherein operations performed by a processor further comprise calculating the hash value based on a name of the business object, a name of a business object node in the business object to which the extension field is added, and a role of a node instance of the business object node.

17. A computer-implemented method as in claim 13, wherein the peripheral object represents a de-normalized view of the business object.

18. A computer-implemented method as in claim 13, wherein the development environment conceals the unique and reproducible name from a user.

19. A computer-implemented method as in claim 13, wherein at least one of the receiving, the accessing, the generating, and the adding is performed by a system comprising at least one programmable processor.

* * * * *